Jan. 4, 1938.  G. E. PELTON ET AL  2,104,469
SUPPLYING INK TO INK TRANSFER MEMBERS
Filed Aug. 7, 1935  2 Sheets-Sheet 1
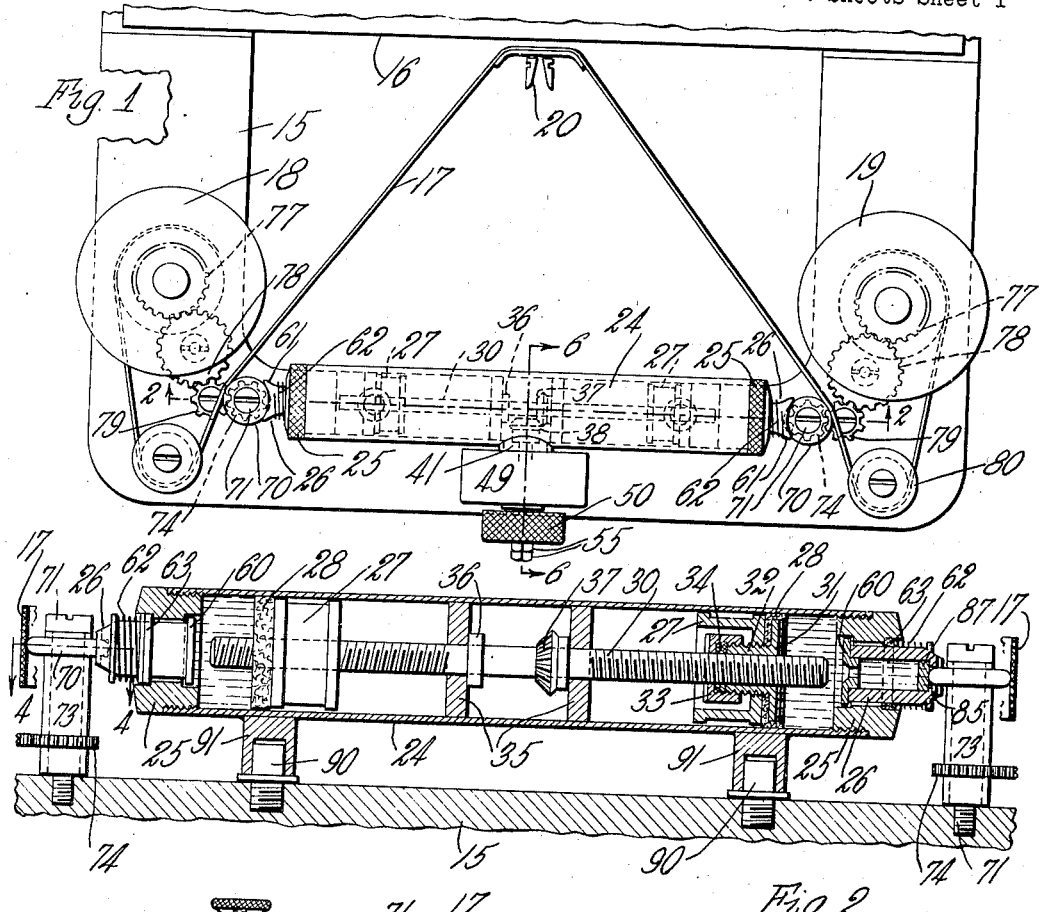
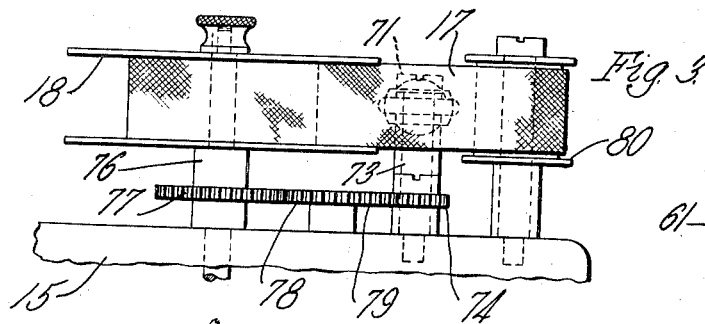
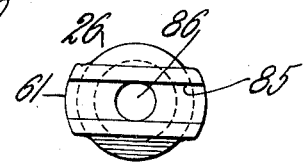
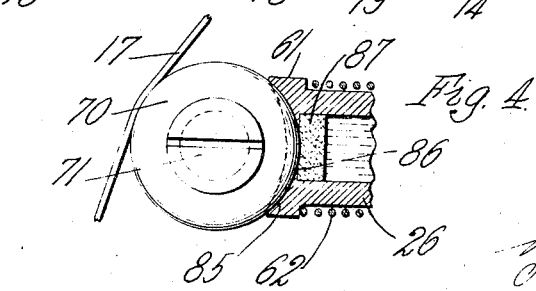
INVENTOR
George E. Pelton
Edward L. Foster
by Parker, Carknow & Farmer
ATTORNEYS Jan. 4, 1938.　　　G. E. PELTON ET AL　　　2,104,469
SUPPLYING INK TO INK TRANSFER MEMBERS
Filed Aug. 7, 1935　　　2 Sheets-Sheet 2
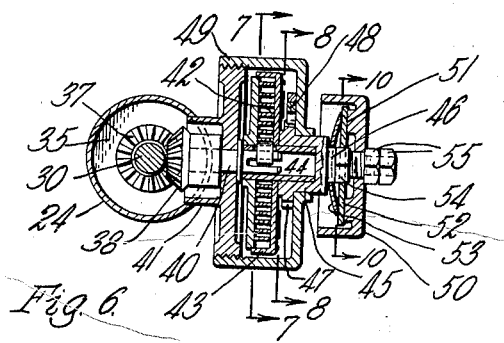
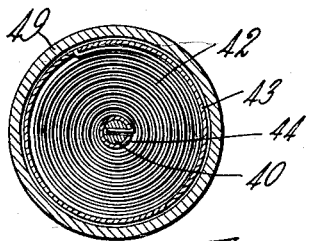
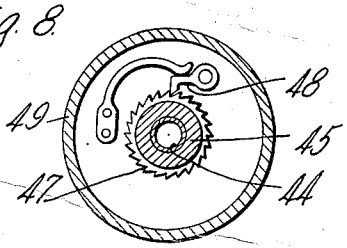
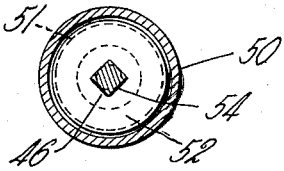
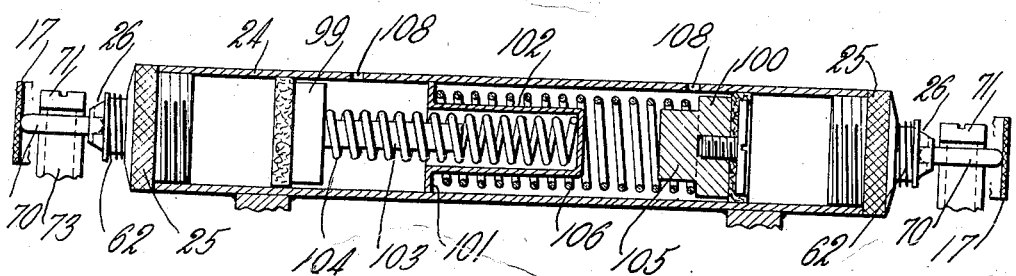
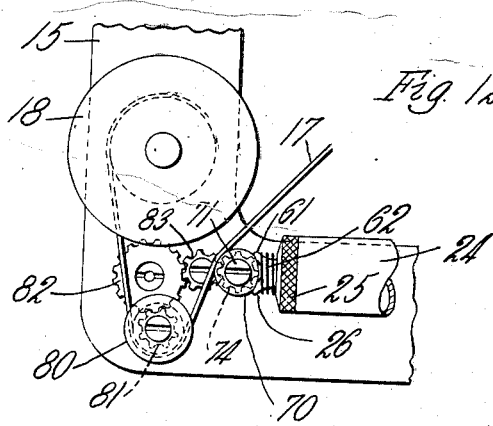
INVENTOR
George E. Pelton
Edward L. Jester
by Parker, Crocknow & Karmer
ATTORNEYS Patented Jan. 4, 1938

2,104,469

UNITED STATES PATENT OFFICE 2,104,469

SUPPLYING INK TO INK TRANSFER MEMBERS

George E. Pelton, Alexandria, Va., and Edward L. Jester, Washington, D. C.; and Jester assignor to said Pelton Application August 7, 1935, Serial No. 35,212

11 Claims. (Cl. 197—171)

This invention relates to devices for supplying ink to the writing ribbons of typing mechanisms, and more particularly to devices of this type which operate continuously during the operation of the typing mechanism to maintain in the writing ribbon a continuous supply of ink.

Ink supply mechanisms of this kind for continuous feeding of ink have heretofore operated mostly on inks which are substantially free from pigments or solid materials, and which contain dissolved dyes for imparting the color to the ink, and such inks could readily be fed through wicks or other capillary feeding mechanisms. Such mechanisms are not suitable for use in connection with pigment inks, since in the first place, the pigments or solid particles in the ink would rapidly clog up the wicks in such mechanisms in which wicks were used, and in other mechanisms, the ink in a reservoir would not remain of uniform consistency, since the pigment or solid material would rapidly precipitate or settle out of the ink into the bottom of the reservoir and would then not be fed to the writing ribbon. Pigment inks have been used for re-inking typewriter ribbons intermittently, and this was generally done by removing the ribbon from the typing mechanism for re-inking or otherwise applying a large quantity of ink to the ribbon at one time. In such cases, the color of the writing done by the ribbon would continuously change, being very heavy and dark when the ribbon was new or freshly inked, and then gradually becoming lighter until re-inking of the ribbon was necessary.

One of the objects of this invention is to provide inking means for writing ribbons of typing mechanisms capable of continuous use during the use of the typing mechanisms and supplying pigment ink or ink containing undissolved matter to the ribbon.

Another object of this invention is to provide improved mechanism operated through the medium of the typing mechanism for continuously supplying to the ribbon a quantity of ink approximately equal to the amount of ink removed from the ribbon during writing.

Another object of the invention is to provide a mechanism of this kind, in which the pigment ink is continually supplied under pressure to the means for depositing the ink on the ribbon.

Further objects of the invention are to provide an ink supply mechanism with nozzles of novel construction for feeding the required amount of ink to the ribbon; also to provide a mechanism of this kind in which settling out of solid matter in the ink will not interfere with the feeding of all parts of the ink to the ribbon; also to provide a mechanism of this kind with spring means of novel construction for forcing the ink out of a container or reservoir for feeding to the ribbon; also to provide a mechanism of this kind in which the quantity of ink deposited on the ribbon may be controlled by the operator to regulate the color of the writing.

Other objects of the invention will appear from the following description and claims.

In the accompanying drawings:

Fig. 1 is a fragmentary top plan view of a typing mechanism having applied thereto a ribbon inking mechanism embodying this invention.

Fig. 2 is a central sectional elevation thereof, on an enlarged scale on line 2—2, Fig. 1.

Fig. 3 is a fragmentary side elevation of the inking mechanism.

Fig. 4 is a sectional plan view thereof, on line 4—4, Fig. 2.

Fig. 5 is an end elevation of an ink discharge nozzle.

Fig. 6 is a longitudinal sectional elevation thereof on line 6—6, Fig. 1.

Figs. 7 and 8 are sections respectively on lines 7—7, and 8—8 of Fig. 6.

Fig. 9 is a face view of a spring member detached from the tension applying mechanism illustrated in Fig. 6.

Fig. 10 is a sectional view on line 10—10, Fig. 6.

Fig. 11 is a central sectional view, partly in elevation, showing an ink feed mechanism of modified construction.

Fig. 12 is a fragmentary top plan view of a portion of the typing mechanism and ink supply mechanism showing a gear drive of modified construction for an ink supply mechanism.

15 represents the frame of a typewriter or other typing mechanism, 16 the platen, 17 the writing ribbon, 18 and 19 the ribbon spools on which the ribbon is wound, and 20 the vibrator for moving the ribbon into and out of writing position with reference to the platen. All of these parts have heretofore been commonly used in connection with typewriting machines, and it will be understood, furthermore, that this invention may be used in connection with type mechanisms of other kinds.

Because of the tendency in pigment ink of the solid particles to settle, we provide means whereby such ink can be uniformly fed by pressure for application to a ribbon in such a manner that the settlement of solid matter in the ink will not interfere with the uniform depositing of the solid matter on the writing ribbon. In the particular construction shown, we accomplish this by providing a reservoir or container in which the ink is fed laterally so that any settled undissolved particles in the ink will be discharged from the reservoir or container continuously during the operation of the inking mechanism. In the particular form shown, this container or reservoir for the ink is in the form of a cylinder or tube 24 provided with means for discharging ink at one or both ends thereof. The particular mechanism illustrated is intended to apply ink to the ribbon at two points, namely, on a portion of the ribbon which is about to pass to the writing position and also to a portion of the same which has just left the writing position, and consequently, the cylinder 24 is arranged crosswise of the typing mechanism so as to dispense ink at opposite sides of the mechanism. It will be understood, however, that, if desired, an inking mechanism may be employed in which the ribbon is inked only in one position.

The cylinder or tube 24 is provided at opposite ends with heads 25 which carry suitable nozzles 26 in which the ink discharge apertures or orifices are formed. 27 represents plungers or pistons which force the ink in the cylinder 24 toward the opposite ends thereof, and in the construction shown, each of these pistons is provided with suitable packing material 28 which may, for example, be in the form of cups of flexible material, as commonly employed in hydraulic apparatus.

The pistons may be moved in opposite directions toward the ends of the cylinder or tube 24 in any suitable or desired manner, and in the particular construction illustrated for this purpose, an actuating rod 30 is provided which has right and left hand screw threads at opposite sides of the middle portion thereof which engage with corresponding threads in the pistons 27, or in some parts connected therewith. As illustrated, the cups or gaskets 28 are held on the pistons by means of disks or circular plates 31, each of which has an inwardly extending sleeve or hub 32, the outer surface of which is threaded and engages with a corresponding threaded part in the piston 27 so as to clamp the packing cup 28 in its operative position with reference to the piston. If desired, a packing nut 33 may also be provided, which compresses suitable packing material 34 against the end of the sleeve 32 and the threaded shaft 30 and forms a seal or tight joint with these parts to prevent leakage of ink along the screw threads. Any other means for accomplishing this result may be employed.

The piston actuating shaft 30 may be journalled in fixed transverse plates or disks 35 suitably secured to the tube or cylinder 24, and the shaft 30 may be held against endwise movement within the cylinder by a flange 36 and a bevel gear 37 secured to the shaft. This bevel gear is arranged to mesh with another bevel gear 38 shown in Fig. 6 for turning the shaft 30.

The pistons are initially positioned at or adjacent to the transverse walls 35 and ink may be placed into the opposite ends of the cylinder 24 by removing the caps 25 one at a time and pouring into the adjacent end of the cylinder, sufficient ink to approximately fill the same and then replacing the cap. By then turning the shaft 30, the pistons 27 can be advanced to force the ink toward the ends of the cylinder.

A slight yielding pressure is preferably applied to the pistons so that they will be continually urged toward the opposite ends of the cylinder or tube. In the particular construction shown for this purpose, the bevel gear 38 is secured on a transverse shaft 40 extending through an aperture in the side of the cylinder 24 and journalled in a suitable frame member 41 mounted on or secured to the cylinder 24. 42 represents a spring which may be similar to a clock spring, one end of which is connected with the shaft 40, and the other end of which is secured to a spring housing 43. The shaft 40 may be frictionally or otherwise connected with a sleeve 44, and this shaft and sleeve are consequently, rotated by the inner end of the coil spring 42. The spring housing 43 has secured thereto a rotatable member having a cup-shaped portion 45 within which the sleeve 44 is journalled and this portion 45 also has a stud 46 extending outwardly therefrom. Ratchet teeth 47 are formed on the outer surface of the cup-shaped member 45 and engage with a spring pawl 48 pivoted on a cover portion 49 of the housing 41. Consequently, by turning the stud 46, the spring housing 43 and the outer end of the coil spring connected therewith will be rotated in such a direction as to wind up the spring 42. The other end of the spring 42 in turn tends to rotate the shaft 40 and turn the bevel gears to advance the pistons toward the outer ends of the cylinder. The coil spring, because of this construction, applies yielding pressure to the pistons tending to force ink through the orifices in the end portions of the cylinder.

To replenish a cylinder with ink the caps 25 are removed and the plungers retracted by turning the members 49 in a counterclockwise direction which will cause the spring and pawl 48 to be disengaged from the ratchet 47. Then the shaft 40 can be rotated in the appropriate direction to retract the pistons after which the spring can be re-engaged with the pawl by turning the member 49 back to its original position.

Since excessively hard winding up of the spring 42 would put excessive pressure upon the pistons or plungers 27, means are preferably provided whereby this spring can only be wound until the same is under a predetermined amount of tension. Any suitable means may be employed for this purpose, and in the construction shown a clutch is interposed between a winding knob 50 and the stud 46. The winding knob 50 is provided with a friction face 51 on its inner face which is adapted to engage with a friction disk 52 urged against the winding knob by means of a spring 53, see Figs. 6 and 9. The winding knob 50 is rotatably mounted upon the stud 42, but the friction member 52 is held against turning relatively to this stud, for example, by means of a square portion 54 on the stud extending through a square aperture on the friction member or disk, so that the disk 52 may move lengthwise of the stud toward and from the winding knob 50. A pair of lock nuts 55 may be used for adjustably holding the winding knob 50 in different positions lengthwise on the stud 46 for adjusting the friction between the knob 50 and the disk 52. Consequently, upon turning the winding knob 50, torque will be transmitted to the stud 46 only through frictional engagement with the friction member or disk 52, which results in the turning of the stud 46 and in the winding of the spring 42. When the spring has been wound to the extent for which the clutch has been set, then further turning of the winding knob 50 will cause the same to slide relatively to the friction disk 52 without further winding of the spring 42. Any other means for limiting the amount of pressure applied to the pistons or plungers may be provided, if desired.

The opposite ends of the cylinder or tube 24 may be provided with any suitable or desired means for dispensing the ink for feeding to the ribbon, and in the construction shown for this purpose, each cap 25 is provided with a nozzle 26 which is of substantially tubular form and has a flange or ring 60 secured to the inner end thereof, the diameter of the ring being greater than that of the nozzle 26 so as to seat against the inner face of the cap 25 to limit the extent to which the nozzle can move outwardly through the aperture in the cap. The disk 60 may be secured in any desired manner to the nozzle 26, for example, by means of a drive fit, or if desired, other means for limiting the outward movement of the nozzle with reference to its cap may be employed. The outer end of the nozzle 26 is provided with a fixed flange 61, and a spring 62 reacts against this flange and against a washer or annular packing gland 63 surrounding the nozzles 26. The result of this structure is that the spring 62 urges the nozzle outwardly with reference to the cap 25 of the tube 24 and the spring 62 also compresses the packing gland or washer 63 so as to form a tight joint between the nozzle 61 and cap 25 to prevent the escape of ink.

The ink is preferably supplied by the nozzle to a disk 70 which, in turn, supplies the ink either directly to the ribbon 17 or to any intermediate member or members which may carry the ink from the disk 70 to the ribbon. This disk, in the construction shown, is mounted to rotate about an upright pin or screw 71, the lower end of which is secured in the frame member 15 of the type mechanism on which the ink supply mechanism may be mounted. The disk is secured to a rotatable sleeve 73 journalled on the pin 71 and if it is desired to provide a positive drive for the disk 71, a gear 74 may be secured on the sleeve 73. The sleeve and its disk may be turned in any desired manner, and in the particular construction illustrated by way of example, in Figs. 1 and 3, the ribbon spools 18 and 19 are used to supply rotation to the disk; in Fig. 3, 76 is the shaft for imparting rotation to a ribbon spool, and 77 is a gear mounted thereon which is connected by means of a pair of idler gears 78 and 79 with the gear 74 of the sleeve 73. Any other means for imparting rotation to the disks 70 may be employed, if desired.

In order to guide the ribbon into operative relation to the disks 10, idler rollers or pulleys 80 may be provided which may also be suitably mounted on the frame member 15 of the typing mechanism or upon any other suitable support. The rotation of the disks 70 may also be effected through the medium of the pulleys or idlers 80, if desired, and in Fig. 12 an arrangement of this kind is shown in which the shaft or sleeve of the idler or pulley 80 has a gear 81 secured thereto which is adapted to mesh with idler gears 82 and 83 for the purpose of transmitting rotary movement to a disk 70. By means of the driving mechanism shown in Fig. 12, a uniform distribution of ink throughout the length of the ribbon is effected, whereas with the driving connection for the disks shown in Figs. 1 and 3, more ink is applied to the ribbon when the same moves slowly so that the distribution of ink is more directly in proportion to the amount of ink removed from the ribbon by the type which is, of course, greater when the ribbon moves more slowly.

In order to feed the correct amount of ink from the nozzles to the disks 70, the outer ends of the nozzles 26 are preferably provided with slots or recesses of substantially the same contour as the outer surfaces of the disk. For this purpose, in the construction shown, the disks are of rounded cross section at their peripheries and each nozzle is provided with a slot 85 of a corresponding contour so that the edges of the disks will fit within the slots 85. Each nozzle is also provided with a discharge orifice or aperture 86 which terminates in the slot 85. Consequently, ink will be discharged through the orifice and will be transferred to the disk from which ink in turn is deposited on the ribbon. It has also been found desirable to control the amount of ink supplied to the disk by placing into each nozzle, adjacent to the aperture 86, a layer of porous substances 87, such as felt or the like, through which the ink will pass slowly to the disk, the porosity of the material, however, being such that solid or undissolved material in the ink will pass through the porous material. Preferably, the porous material is so located that it will contact with the disk through the hole 86, as shown in Fig. 4.

The nozzles may be of any desired shape but preferably the outer ends thereof are elongated in the plane of the disks and their outer faces are curved or concave so as to provide less frictional contact with the disks. The faces of the disks serve to close the ink discharge apertures of the nozzles so that when the typing mechanism is not in use, the discharge of ink through the apertures is prevented. Because of the slight looseness of the nozzles due to their clearances with the openings in the caps 25 through which the nozzles extend, the turning movement of a disk 70 will tend to move the nozzle to a slight extent in the direction of rotation of adjacent portions of the disk so that the portion of the disk passing out of contact with the porous member 87 in the aperture will be also out of contact with the portion of the slot 85 extending from the aperture 86 to the edge of the nozzle at which that portion of the disk leaves the nozzle. Consequently, the nozzle will not scrape from the disk the slight deposit of ink deposited thereon. When the direction of rotation of the disk is reversed, a similar movement of the nozzle in the opposite direction takes place, so that ink may be carried from the nozzle from the opposite side thereof.

The cylinder or ink reservoir 24 may be mounted on the frame 15 of the typewriter or other typing mechanism in any suitable or desired manner. In the particular construction shown, a pair of studs 90 are secured to the frame 15 and the tube or cylinder 24 has lugs or parts 91 secured thereto which have recesses extending upwardly from the lower ends thereof which are formed to receive the studs 90. When it is desired to move the reservoir or cylinder 24 into or out of operative position with reference to the disks 70, the nozzles 26 are pressed inwardly against the actions of their springs 62, until the nozzles are out of engagement with the disks 70, whereupon the ink magazine or cylinder 24 may be moved out of or into its operative relation in which the lugs 91 are out of or in engagement with the studs 90. Any other means for securing the cylinder or magazine in operative relation to the inking mechanism may, of course, be employed, if desired.

In the use of the mechanism described, after the magazine has been charged with ink, tension is applied to the spring 42 by rotation of the winding knob 50 so that the threaded shaft 30 is turned to apply the proper pressure on the pistons or plungers 27. During the operation of the mechanism, the person using the same can readily keep the necessary tension on the spring 42 by turning the winding knob 50 at intervals, for example, once a day, or oftener, since too much turning of the knob 50 will not apply excessive pressure on the spring 42 because of the clutch mechanism, which has been described. The magazine or cylinder 24 is preferably built of such size as to contain sufficient ink to keep the ribbon properly inked for a long period of time, for example, a year or two in an ordinary office, and when the ink supply is exhausted, it can be readily replenished by removing the cylinder from its operative position, removing the caps 25, and pouring ink into the ends of the cylinder, as has already been described. Other means for replenishing the ink supply could, of course, be provided, if desired.

Fig. 11 shows a modified mechanism for supplying ink continuously at the desired pressure without the necessity of applying tension to the springs. In this construction, the ink reservoir or cylinder 24 is provided with pistons 99 and 100 and the cylinder has a cup-shaped partition member arranged in the middle portion thereof, having a flange 101 secured to the cylinder 24 and a cylindrical part 102 closed at one end and spaced from the cylinder wall and arranged substantially concentric therein. The piston 99 has a stem 103 secured thereto and extending toward the center of the cylinder 24 and a spring 104 is arranged about this stem and extends into the cylindrical part 102 of the partition or cup-shaped member in the cylinder. The other piston 100 has a shorter stem 105 and is pressed outwardly by means of a spring 106 surrounding the stem and also the cup-shaped part 102. By means of this construction, relatively long springs can be used, one for each piston which urge these pistons with substantially the same force toward their outer positions. In order to facilitate the placing of ink into the ends of the cylinder, the cylinder is provided with small apertures 108. Consequently, when it is desired to fill the reservoir with ink, after the caps 25 have been removed, the pistons are pressed inwardly with reference to the cylinder until the outer end of each piston is beyond an aperture 108, whereupon a pin may be inserted into the aperture to hold the piston in its innermost position. Ink can then be poured into the cylinder and the cap 25 replaced. Upon withdrawing the pin from the hole 108, the spring will move the piston forwardly to apply the desired amount of pressure to the ink.

In both of the constructions illustrated, it will be obvious that the outward movement of the pistons positively displaces the ink contained in the ends of the cylinders, and consequently, whether the ink is of uniform consistency or whether portions of the ink have settled out, all parts of the ink will, nevertheless, be forced out of the apertures in the nozzles for deposit upon the writing ribbon. While the mechanism shown is described as particularly adaptable for use in connection with pigment inks, it will be obvious that the mechanism will operate in connection with any suitable ink whether the same contains pigments or undissolved particles, or whether the same is a true solution. The rate at which the ink is fed to the disks may be controlled in various ways, either by varying the spring tension urging the pistons into their outer positions, or by varying the porous members or pads 87. For example, if an extremely thick ink is used, relatively thin or very porous pads 87 should be used, and when a light bodied ink is employed, thicker or less porous pads are preferably employed. Similarly the amount of ink in the characters or writing produced by the typing mechanism can be controlled. If heavy or dark writing is desired, the pressure of the spring 53 on the clutch member 52 can be increased by adjustment of the lock nuts 55 to provide for greater pressure on the ink supply, or by using a more porous pad 87. Lighter shades of writing can be produced by exerting less pressure on the ink or by using a pad 87 of denser material or greater thickness. In this manner, an accurate control of the supply of ink to the writing ribbon is made possible.

Because of the slight movement of the nozzles relatively to the cylinder and because of the close fit between the disks and the orifices, the disks will, when not rotating, seal the orifices in the nozzles and thus prevent escape of ink when the typing mechanism is not in use. Rotation of the disks in either direction, however, causes the nozzles to tilt to a sufficient extent to permit the peripheries of the disks to carry thin films of ink from the nozzles for deposit on the ribbon.

We claim as our invention:

1. In a typing mechanism including a writing ribbon, the combination of a tube containing ink and having a discharge orifice, a plunger in said tube, adjustable yielding means outside of said tube operatively connected to said plunger within said tube for yieldingly urging said plunger toward said orifice to discharge ink through the same, and a movable member on which ink is deposited from said orifice and from which ink is transferred to said ribbon.

2. An ink supply device for a writing ribbon of a typing mechanism, including a tube containing ink, a plunger in said tube for exerting pressure on said ink, a supply nozzle receiving ink under pressure from said tube and having a discharge orifice, and a disk having its periphery disposed in operative relation to and receiving ink directly from said nozzle orifice and from which ink is transferred to said ribbon.

3. An ink supply device for a writing ribbon of a typing mechanism, including a cylinder adapted to contain ink in opposite end portions thereof and having discharge orifices for ink at the ends thereof, plungers movably arranged in said cylinder to urge ink toward said orifices, rotatable means for simultaneously urging said plungers toward the ends of said cylinder, spring means for actuating said rotatable means, and disks rotatably arranged adjacent to said orifices to receive ink therefrom for deposit on said ribbon.

4. In an ink supply device for a writing ribbon of a typing mechanism, the combination of a cylinder containing ink in opposite end portions thereof, discharge nozzles for ink at opposite ends of said cylinder, plungers movably arranged in said cylinder, a common operating member within said cylinder engageable with said plunger and by which both are simultaneously urged toward opposite ends of said cylinder to force ink through said nozzles, and movable members coacting with said nozzles and receiving ink therefrom for deposit on said writing ribbon.

5. In an ink supply device for a typing mechanism including a writing ribbon, the combination of a container for ink, means for applying pressure to the ink in said container, a nozzle through which ink is discharged from said container and which is movably mounted on said container, a movable member to which ink is discharged from said container for transfer to said ribbon, and means for urging said nozzle yieldingly into engagement with said member.

6. In an ink supply device for a typing mechanism including a writing ribbon, the combination of a container for ink having a discharge orifice, a movable member to which ink is discharged from said orifice for transfer to said ribbon, means for applying pressure to the ink, and a floating member in said container held in associated relation with said orifice by the pressure of the ink thereagainst for controlling the discharge of ink to said member.

7. In an ink supply device for a writing ribbon of a typing mechanism, the combination of a cylinder for ink, a plunger in said cylinder applying pressure to the ink, means for discharging ink from said cylinder for transfer to said ribbon, a spring for applying yielding pressure to said plunger, and manually operable means for applying tension to said spring and including a clutch which limits the amount of tension which may be applied to said spring.

8. In an ink supply device for a writing ribbon of a typing mechanism, the combination of a cylinder adapted to contain ink in opposite end portions thereof and having discharge orifices for ink at the ends thereof, plungers movably arranged in said cylinder to urge ink toward said orifices, and a pair of coil springs contained in said cylinder each acting on a plunger, one of said springs being arranged partly within the other.

9. In an ink supply device for a writing ribbon of a typing mechanism, the combination of a cylinder for ink having an aperture therein within which a nozzle is mounted so as to have a limited lateral movement relatively to said cylinder and which has a discharge orifice, a plunger in said cylinder for applying pressure to said ink to force the same through said nozzle orifice, a rotatable disk engageable with said nozzle and which, when stationary, holds said nozzle in axial alinement with said cylinder aperture and closes said discharge orifice, and said nozzle being movable laterally out of axial alinement with said cylinder aperture upon and by rotation of said disk to thereby shift said discharge orifice out of closed relation with said disk to enable the ink to be discharged, and means for rotating said disk.

10. In an ink supply device for a writing ribbon of a typing mechanism, the combination of a cylinder for ink having a bore through an end thereof, a nozzle arranged in and extending through said bore so as to have a limited lateral movement therein, spring means interposed between said cylinder and said nozzle for holding the latter yieldingly in said aperture, said nozzle having a discharge orifice communicating with said cylinder, a rotatable disk engageable with said nozzle and which, when stationary, cooperates with said spring means for holding said nozzle axially in said cylinder bore and closes said discharge orifice, said nozzle being moved laterally in said bore against the action of said spring means upon and by rotation of said disk, thereby shifting said orifice out of closed relation with said disk to enable the ink to be discharged, and means actuated by said typing mechanism for imparting rotation to said disk, whereby the latter receives said discharged ink for transfer to said ribbon.

11. In an ink supply device for a writing ribbon of a typing mechanism, the combination of a cylinder for ink having a bore through an end thereof, a nozzle arranged in and extending through said bore so as to have a limited lateral movement therein, spring means interposed between said cylinder and said nozzle for holding the latter yieldingly in said aperture, said nozzle having a discharge orifice communicating with said cylinder, and a narrow curved slot at the outer end of said nozzle with which orifice communicates, a rotatable disk which fits in said curved slot and cooperates with said spring means for holding said nozzle axially in said bore and closes said orifice when said disk is stationary, said nozzle being moved laterally in said bore against the action of said spring means upon rotation of said disk, thereby shifting said curved slot and said orifice out of closed relation with said disk to enable ink to be discharged, and means actuated by said typing mechanism for imparting rotation to said disk, whereby the latter receives said discharged ink for transfer to said ribbon.

GEORGE E. PELTON.
EDWARD L. JESTER.